US005933770A

United States Patent [19]

Heiter

[11] Patent Number: 5,933,770

[45] **Date of Patent: *Aug. 3, 1999**

[54] LOW DISTORTION TUNER-RECEIVER WITH BRIDGE-TYPE DIPLEXER

[75] Inventor: George Ludwig Heiter, Andover, Mass.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/563,154

[22] Filed: Nov. 27, 1995

[51] Int. Cl.[6] .................................................. H04B 1/10

[52] U.S. Cl. .......................... 455/307; 455/303; 455/315; 333/126; 333/132

[58] Field of Search ............................. 455/189.1, 190.1, 455/295, 303, 306, 307, 337, 314, 315, 338, 339, 340, 302; 333/110, 126, 129, 132, 134; 348/731; 334/110, 202, 204, 206, 208

[56] References Cited

U.S. PATENT DOCUMENTS

| | | | |
|---|---|---|---|
| 3,252,113 | 5/1966 | Veltrop | 333/10 |
| 3,668,564 | 6/1972 | Ren et al. . | |
| 3,668,565 | 6/1972 | Tuchen . | |
| 3,845,415 | 10/1974 | Ando . | |
| 4,553,264 | 11/1985 | Hasegawa et al. | 455/189 |
| 4,752,741 | 6/1988 | Kim et al. | 328/165 |
| 4,783,639 | 11/1988 | Hudspeth et al. . | |
| 4,920,351 | 4/1990 | Bartlett et al. . | |
| 4,937,533 | 6/1990 | Livingston . | |
| 5,010,400 | 4/1991 | Oto | 358/86 |
| 5,155,724 | 10/1992 | Edwards . | |
| 5,180,999 | 1/1993 | Edwards . | |
| 5,390,337 | 2/1995 | Jelinek et al. | 455/5.1 |
| 5,402,138 | 3/1995 | Hulett et al. . | |
| 5,437,052 | 7/1995 | Hemmie et al. . | |

*Primary Examiner*—Andrew I. Faile
*Assistant Examiner*—Christopher Onuaku

[57] ABSTRACT

A receiver system and method of operation are used to tune a selected channel from an input spectrum. The receiver includes an up-converter which responds to a selection setting for up-converting the input spectrum, including the selected channel and an unwanted spectrum; a first diplexer for dissipating the energy of the unwanted spectrum in a manner to reduce distortion effects on the up-converter; a down-converter for down-converting the up-converted selected channel having associated upper and lower sidebands and an intermediate frequency component; and a second diplexer for dissipating the energy of the upper and lower sidebands of the down-converted selected channel in a manner to improve intermodulation of the down-converter.

10 Claims, 4 Drawing Sheets

FIRST DIPLEXER
PRESELECTOR
FROM PREAMPLIFIER
SECOND DIPLEXER
TO IF STRIP
PLL
PLL
L01
L02
P1 P2 P3 P4
16 24 26 28 30 32 34 46 48 50 52 54 56 58 60 62 64 66 68 70 72 73

16
PRESELECTOR
TO IF STRIP
73
SECOND DIPLEXER
34
56
58
30
64
66
PLL
LO2
32
54
P2
P3
48
70
P1
P4
68
50
52
72
FIRST DIPLEXER
46
28
FROM PREAMPLIFIER
24
60
62
LO1
26

FROM PRESELECTOR
18
IF STRIP
74
76
78
84
80
88
DETECTOR
82
86
92
90
A/D CONVERTER
TO DEMODULATOR
TO RF DETECTOR
TO RECEIVER LEVEL OUTPUTS

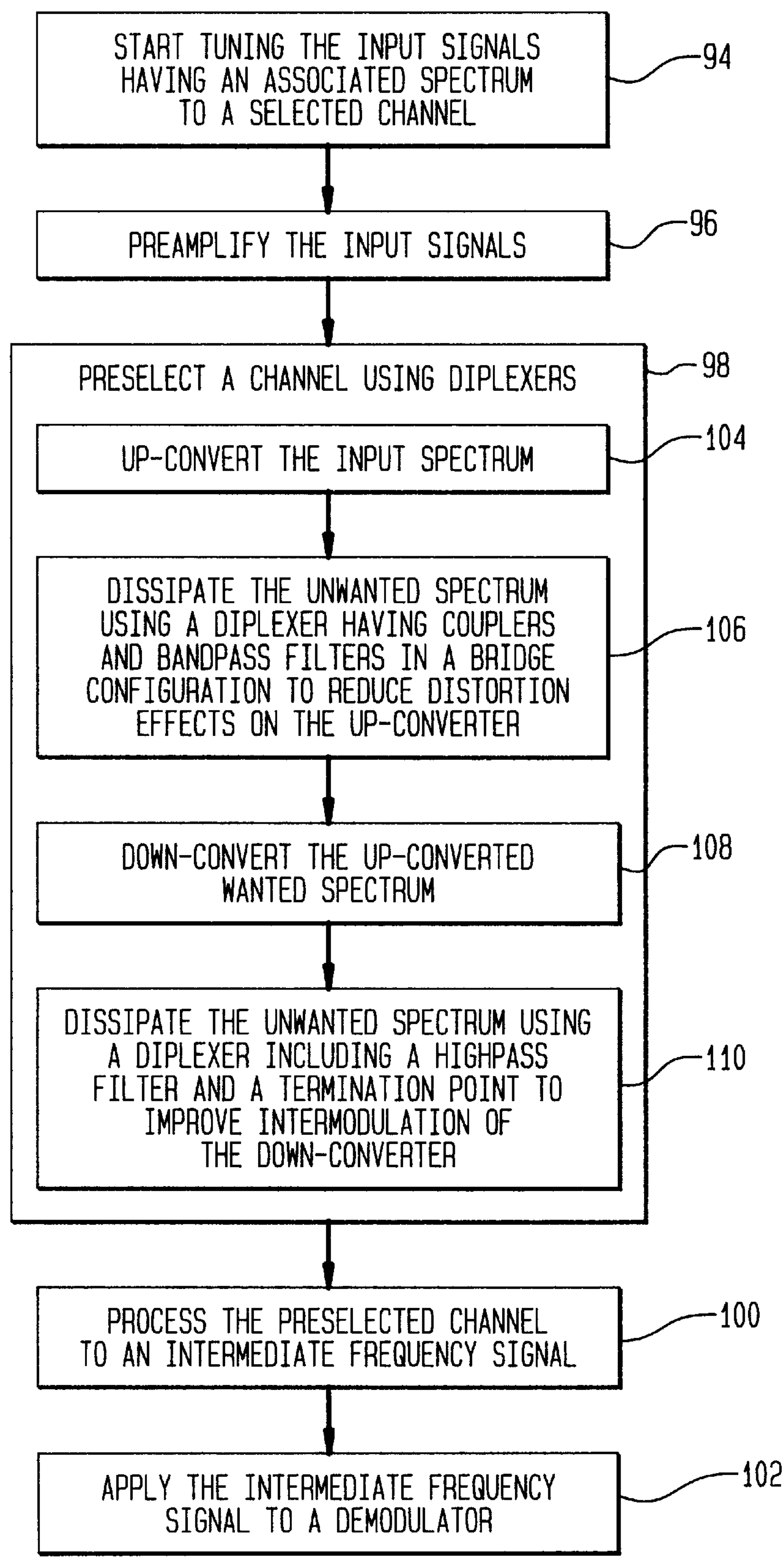
FIG. 5
START TUNING THE INPUT SIGNALS HAVING AN ASSOCIATED SPECTRUM TO A SELECTED CHANNEL
94
PREAMPLIFY THE INPUT SIGNALS
96
PRESELECT A CHANNEL USING DIPLEXERS
98
UP-CONVERT THE INPUT SPECTRUM
104
DISSIPATE THE UNWANTED SPECTRUM USING A DIPLEXER HAVING COUPLERS AND BANDPASS FILTERS IN A BRIDGE CONFIGURATION TO REDUCE DISTORTION EFFECTS ON THE UP-CONVERTER
106
DOWN-CONVERT THE UP-CONVERTED WANTED SPECTRUM
108
DISSIPATE THE UNWANTED SPECTRUM USING A DIPLEXER INCLUDING A HIGHPASS FILTER AND A TERMINATION POINT TO IMPROVE INTERMODULATION OF THE DOWN-CONVERTER
110
PROCESS THE PRESELECTED CHANNEL TO AN INTERMEDIATE FREQUENCY SIGNAL
100
APPLY THE INTERMEDIATE FREQUENCY SIGNAL TO A DEMODULATOR
102

LOW DISTORTION TUNER-RECEIVER WITH BRIDGE-TYPE DIPLEXER

BACKGROUND INFORMATION

1. Technical Field

This disclosure relates to multichannel communications systems, and in particular to receivers for selecting channels.

2. Description of the Related Art

In multichannel communication systems, receivers may select a desired channel for reception from a broader input signal spectrum which includes a number of available channels. In one known implementation, a receiver having tuner capabilities may use a dual conversion reception technique, such that the entire input signal spectrum is first up-converted to a relatively high frequency. At such high frequencies, preselection of the desired channel or sub-spectrum is performed, and the remainder of the input spectrum is discarded. The desired channel is then down-converted such that it falls substantially close to the center of the operating range of a channel selection filter. The output of the channel selection filter is then input to a channel demodulator which is common to all channels.

Two critical parameters in receiver design and operation are noise figure and modulation distortion. Some receivers may minimize distortion while sacrificing good noise figure characteristics. Typically, both noise figure and modulation distortion effects may be improved using relatively expensive and/or complicated receiver implementations.

The use of a standard filter following an up-converter is known in the art for performing the basic function of filtering unwanted spectra. However, the unwanted spectrum, which may represent, for example, about 90% of the incident energy, may be reflected back into the up-converter, causing unacceptable intermodulation performance. It is also known that a buffer amplifier may be inserted between the up-converting mixer and the filter to reduce the reflected energy into the up-converter, but the use of such a buffer amplifier may cause distortion in the output stage of the buffer amplifier. Even a "unity gain" amplifier may exhibit such distortion.

Diplex filters using either high-pass or low-pass filters may be used to direct the energy of the unwanted spectrum to a termination circuit, such as a resistor, for dissipating the energy. However, such filters do not perform the filtering satisfactorily for receivers used in very broadband operation, since the unwanted spectra are below or above the desired channel for high or low frequency channels, respectively. Such deficiencies in known receiving techniques have been difficult to remedy with inexpensive implementations.

SUMMARY

It is recognized herein that receivers may be configured using diplexers for tuning a channel and for dissipating the energy of the unwanted spectrum to improve both noise figure and minimization of modulation distortion effects using a relatively inexpensive and less complicated implementation.

A receiver system and method of operation are disclosed for tuning a selected channel from an input spectrum. The receiver includes: an up-converter which responds to a selection setting for up-converting the input spectrum, including the selected channel and an unwanted spectrum; a first diplexer for dissipating the energy of the unwanted spectrum in a manner to reduce distortion effects on the up-converter; a down-converter for down-converting the up-converted selected channel having associated upper and lower sidebands and an associated intermediate frequency component; and a second diplexer for dissipating the energy of the upper and lower sidebands of the down-converted selected channel in a manner to improve intermodulation of the down-converter.

BRIEF DESCRIPTION OF THE DRAWINGS

The features of the disclosed receiver and method will become more readily apparent and may be better understood by referring to the following detailed description of an illustrative embodiment of the present invention, taken in conjunction with the accompanying drawings, where:

FIG. 5 is a flowchart illustrating a method of operation of the disclosed receiver.

DESCRIPTION OF THE PREFERRED EMBODIMENTS

Figure 1:
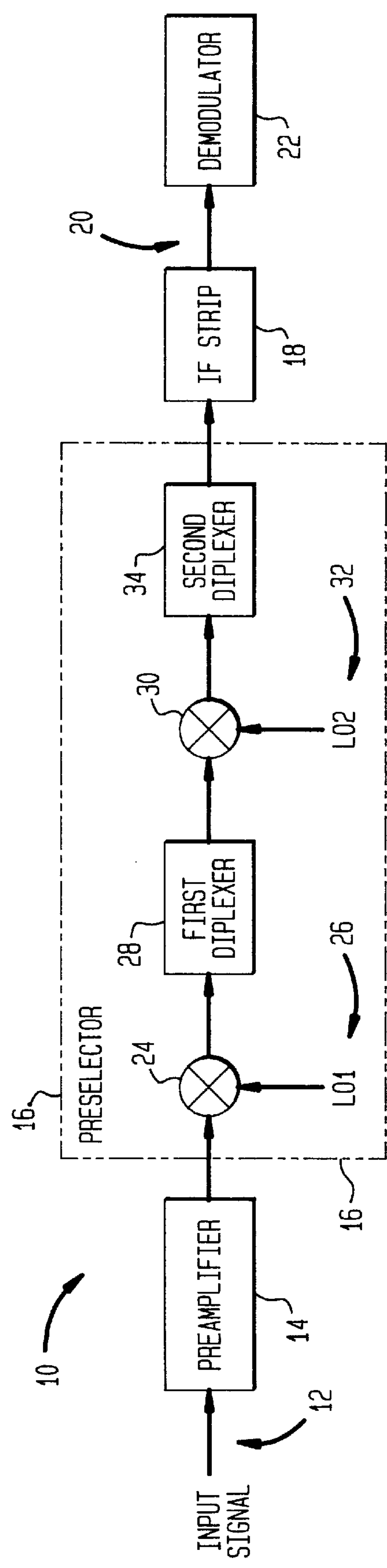
FIG. 1 is a block diagram of the disclosed receiver.

Referring now in specific detail to the drawings, with like reference numerals identifying similar or identical elements, as shown in FIG. 1, the present disclosure describes receiver 10 adapted to receive input signal 12 having a complete input spectrum ranging, for example, from about 100 MHz to about 410 MHz having a plurality of channels with a channel spacing of about 1.8 MHz. Receiver 10 provides for improved selectivity and tuning of a channel from the input spectrum. Receiver 10 also uses diplexers for use with termination points for dissipating the energy of the unwanted spectrum to improve both noise figure and minimization of modulation distortion effects using a relatively inexpensive and less complicated implementation.

In an exemplary embodiment, receiver 10 includes preamplifier circuit 14, preselector circuit 16, and intermediate frequency strip 18 for generating output signal 20 to be applied to demodulator 22. Preselector circuit 16 includes first mixer 24 for receiving first local oscillator signal 26, labelled L01. First mixer 24 is operatively connected to first diplexer 28, which, in turn, is operatively connected to second mixer 30 to receive second local oscillator signal 32, labelled L02. Second mixer 30 is operatively connected to second diplexer 34, which is operatively connected to intermediate frequency strip 18. Preselector 16 is described in greater detail below.

An input signal 12 is received from, for example, antenna circuitry or other signal receiving devices known in the art. The input level per active channel varies between about −35 dBm and about −60 dBm.

Figure 2:
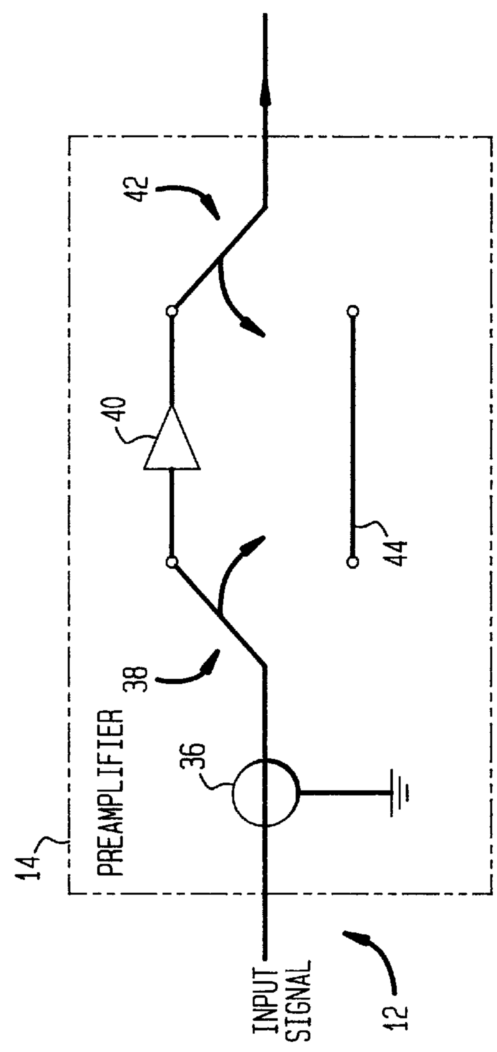
FIG. 2 illustrates an embodiment of a preamplifier circuit in accordance with the present disclosure.

As shown in FIG. 2, preamplifier circuit 14 may include: coaxial connector 36, such as a 75 Ω coaxial connector; first switch 38; low-noise amplifier 40; and second switch 42. Switches 38, 42 are for switching input signal 12. Preamplifier circuit 14 is used to amplify the lower input power levels below a predetermined power level threshold to meet the noise figure requirements. Preamplifier circuit 14 operates to switch input signal 12 between low-noise amplifier 40 and non-amplified connection 44, such that low-noise amplifier 40 is switched out for higher received levels in order to meet intermodulation requirements. The switching out of amplifier 40 is performed for single channel input power levels exceeding about −45 dBm.

The channels of receiver 10 may be fully loaded, resulting in a total input load which is approximately 20 dB above the single channel input level. Preselector circuit 16 reduces the 20 dB ratio of input power levels to second mixer 30 to about 5 dB.

Preselector circuit 16 operates at about 1600 MHz with a bandwidth of about 6 MHz to substantially eliminate any undesired portion of the input spectrum and thence to output the desired channel to intermediate frequency strip 18.

Figure 3:
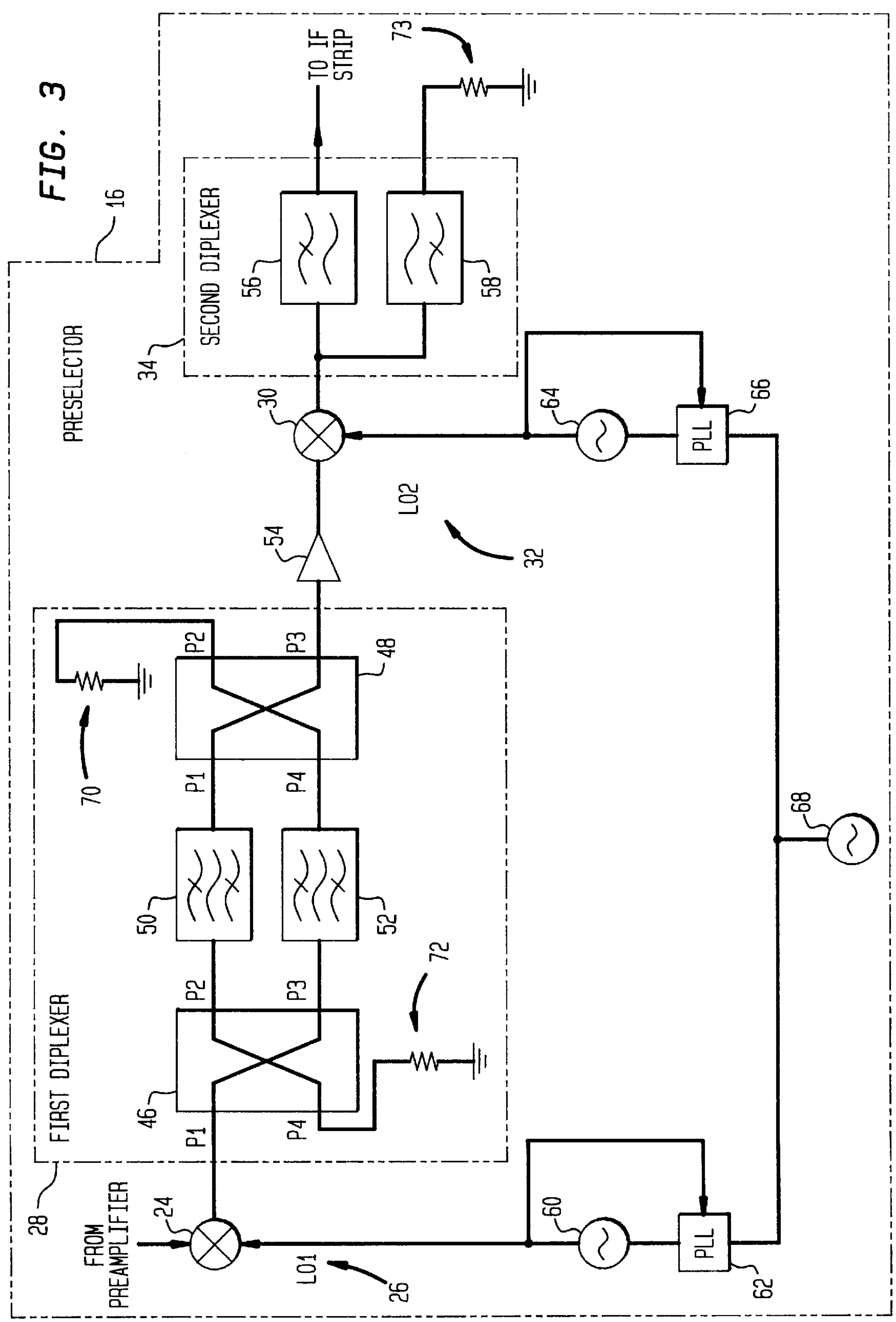
FIG. 3 illustrates an embodiment of a preselector circuit using diplexers in accordance with the present disclosure.

As shown in FIG. 3, preselector circuit 16 includes first mixer 24 connected to first diplexer 28 having couplers 46, 48 and a pair of substantially identical bandpass filters 50, 52 therebetween. Amplifier 54 operatively connects first diplexer 28 to second mixer 30. Second diplexer 34 includes lowpass filter 56 and highpass filter 58, with lowpass filter 56 being operatively connected to intermediate frequency strip 18.

First mixer 24 operates as an up-converter for receiver 10, with the local oscillator frequency of first mixer 24 being selected using first voltage-controlled oscillator 60 and first phase-lock loop circuit 62, to place a desired channel at about the center of the operating range of bandpass filters 50, 52.

Second mixer 30 operates as a down-converter, and receives second local oscillator signal 32 from second voltage-controlled oscillator 64 connected to second phase-lock loop 66. In an exemplary embodiment, first voltage-controlled oscillator 60 operates in the range between about 1200 MHz and about 1500 MHz, and second voltage-controlled oscillator 64 operates at about 1566 MHz. Phase-lock loops 62, 66 are operatively connected to common reference crystal oscillator 68 which operates at about 15.36 MHz.

To reduce the effects of reflection of unwanted spectra back into first mixer 24 without using buffer amplifiers, receiver 10 employs diplexers 28, 34 in a diplexing filter configuration to direct the energy of the unwanted spectra to a respective termination circuit, such as resistors 72, 73, each having a resistance of about 50 Ω, for very broadband ranges. Resistor 70 terminates the unused difference at port P2 of coupler 48 to dissipate any energy thereto.

Bandpass filters 50, 52 are used during the channel preselection process, and receiver 10 uses lowpass filter 56 and highpass filter 58 of second diplexer 34 as complementary filters. Such a complementary arrangement of filters 56, 58 directs substantially all unwanted spectral components to resistors as termination circuits.

Bandpass filters 50, 52 are in a bridge arrangement located between two substantially identical quadrature, equal split (3 dB) hybrid couplers 46, 48. First coupler 46 operates as a splitting coupler, and second coupler 48 operates as a combining coupler.

The up-converted signal output from first mixer 24 includes both upper and lower sidebands, and is incident on first port P1 of first coupler 46. First coupler 46 splits the signal between its two output ports (ports P2 and P3) with substantially equal amplitudes, but with a differential phase shift of about 90°. The portion of the incident signal spectra which falls into the passband of bandpass filters 50, 52 reaches second coupler 48, as a combining coupler, with substantially equal amplitudes but about 90° out of phase, since they are traversing substantially equal path lengths.

Second coupler 48 also introduces a differential phase shift of about 90° into each of the signals, which results in the vector subtraction and vector addition of the two signals at output ports P2 and P3, respectively. The vector subtraction of the two signals is then dissipated by being output to resistor 70, which may have a resistance of 50 Ω, as a termination circuit. Therefore, except for any insertion losses of the components of first diplexer 28, the desired portion of the incident signal spectrum is output at port P3 of second coupler 48.

In first diplexer 28, the portion of the incident signal spectra which falls outside the passband of bandpass filters 50, 52 is reflected into ports P2 and P3 of first coupler 46. A second differential phase shift of about 90° is introduced by first coupler 46 into both reflected signals such that vector addition and vector subtraction takes place in ports P4 and P1 of first coupler 46, respectively. As a result, substantially all unwanted spectral components in both the upper and lower sidebands of the output from first mixer 24 appear at port P4 of first coupler 46 and are dissipated by resistor 72, which may have a resistance of about 50 Ω, as a termination circuit connected to port P4.

The passband portion is then amplified by amplifier 54 and down-converted with a fixed local oscillator frequency using second mixer 30 to generate a down-converted channel having associated upper and lower sidebands and an intermediate frequency component, with the down-converted channel then applied to the input of second diplexer 34. Second diplexer 34 includes lowpass filter 56 and highpass filter 58 in a low-pass, high-pass filter configuration for providing improved intermodulation performance of down-converting mixer 30.

As shown in FIG. 3, lowpass filter 56 filters the down-converted channel of down-converting mixer 30 to apply the intermediate frequency component to intermediate frequency strip 18. Highpass filter 58 filters the down-converted output to pass the upper and lower sidebands to resistor 73, which may have a resistance of about 50 Ω, as a termination point. By dissipating the energy of the unwanted upper and lower sidebands, reflection of such energy to down-converting mixer 30 is avoided, and second diplexer 34 thus reduces the distortion of the down-converted selected channel from down-converting mixer 30.

A significant improvement in the intermodulation performance of preselector circuit 16 is thus achieved by providing terminations for all significant spectral components at the outputs of mixers 24, 30. The output of preselector circuit 16 is, therefore, a bandlimited signal, for example, being about 6 MHz wide at about 46 MHz with the desired channel located at about the center of the band.

Figure 4:
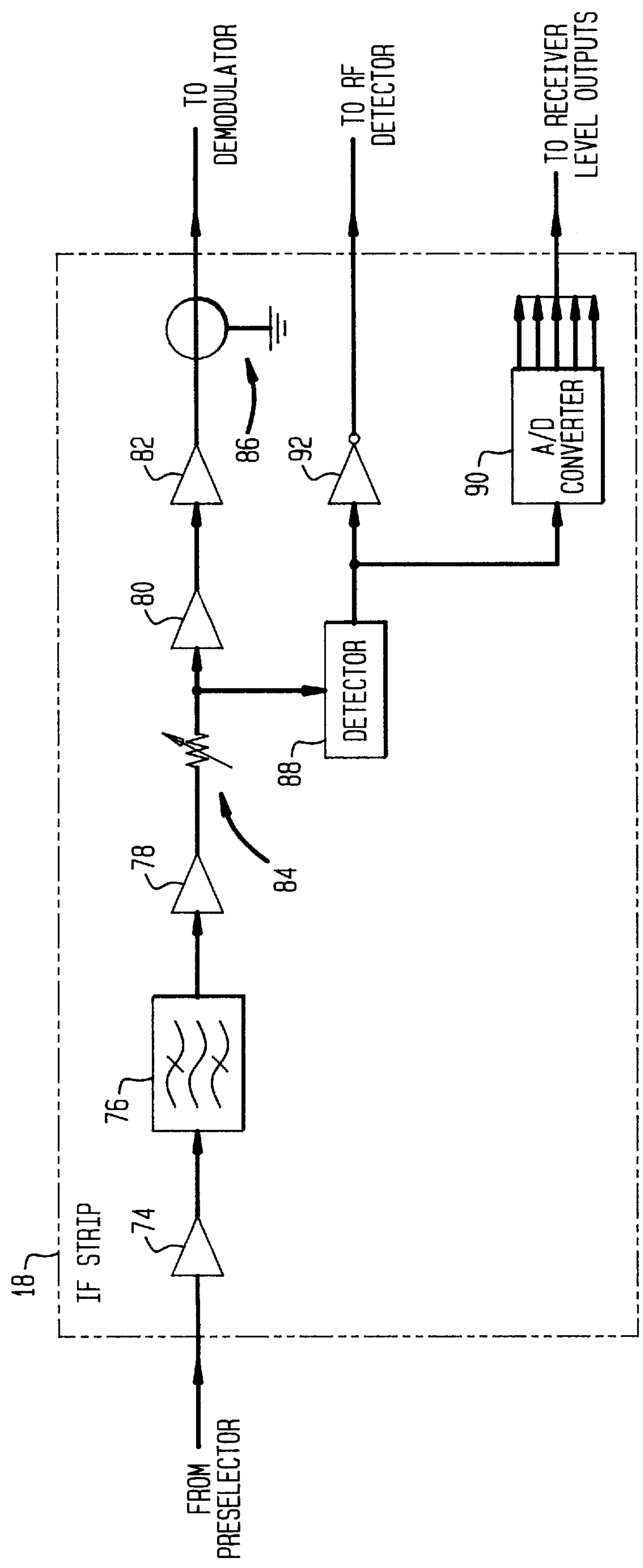
FIG. 4 illustrates an embodiment of an intermediate frequency strip in accordance with the present disclosure.

As shown in FIG. 4, the input signal to intermediate frequency strip 18 is provided by down-converting mixer 30 with a fixed local oscillator frequency to convert the bandlimited 1600 MHz signal to the desired intermediate frequency of about 46 MHz. The input signal to intermediate frequency strip 18 is the sub-spectrum of the receiver input signal centered at the desired channel and translated to the input intermediate frequency of demodulator 22. Intermediate frequency strip 18 includes amplifier 74 for receiving and amplifying the bandlimited signal from preselector circuit 16. The amplified signal is filtered by bandpass filter 76 as a channel filter, which provides the final channel selection and shaping for subsequent application to demodulator 22. At least one amplifier, such as amplifier 80, 82, and variable attenuator 84 provide the appropriate gain to supply an input signal at about +4 dBm to demodulator 22 through, for example, coaxial connector 86, such as a 50 Ω coaxial connector. Variable attenuator 84 may be a step attenuator or a variable resistor.

Bandpass filter 76 may be a carefully shaped filter, such as a surface acoustic wave filter, which is buffered by amplifiers 74, 78 to provide the final channel selectivity required by the Nyquist criteria for digital transmission. The reverse isolation of first amplifier 74 provides the attenuation of the reflected out-of-band signal spectrum between bandpass filter 76 and down-converting mixer 30. The dynamic range of the input signal is about 8 dB to about 10 dB.

Receiver 10 may be configured as a burst receiver, with signals from, for example, 20 different transmitters being transmitted in different time slots. In burst mode operation, standard automatic gain control techniques may not be employed to satisfy 4 dB input tolerance requirements for demodulator 22. Accordingly, variable attenuator 84 may be set initially to account for the operating environment of receiver 10. Corresponding transmitters may be controlled, for example, by remote control techniques, including feedback to provide the appropriate signal levels to improve the demodulation by demodulator 22.

Such feedback may be implemented using a burst amplitude detector 88 operatively connected to variable attenuator 84 to provide the attenuated output signal to analog-to-digital converter 90 and inverter 92. Analog-to-digital converter 90 provides receiver signal levels, and inverter 92 provides a radio frequency detection signal, with such receiver signal levels and the radio frequency detection signal being applied as input signals to transmitters for use in the amplitude-adjustment feedback function.

In use, receiver 10 operates using the method disclosed in FIG. 5, in which receiver 10 starts tuning input signal 12 in step 94; preamplifies input signal 12 having a spectrum in step 96; preselects a channel or sub-spectrum using at least diplexers 28, 34 in step 98; processes the preselected channel using intermediate frequency strip 18 in step 100; and applies the output of intermediate frequency strip 18 to demodulator 22 in step 102. The step of preselecting in step 98 may further include the steps of up-converting the input spectrum, including the selected channel and an unwanted spectrum, in step 104; dissipating the energy of the unwanted spectrum in step 106 to reduce distortion effects on the up-converter; down-converting the up-converted selected channel having associated upper and lower sidebands in step 108; and dissipating the energy of the upper and lower sidebands of the down-converted selected channel to improve intermodulation of down-converter in step 110.

The step of dissipating the energy of the unwanted spectrum in step 106 may include the steps of receiving the up-converted selected channel at a first coupler; splitting the up-converted signal to generate split signals; filtering the split signals using a plurality of bandpass filters to generate filtered signals; generating a reflected signal from the filtering of the split signals from the plurality of bandpass filters, with the reflected signal corresponding to the unwanted spectrum; and dissipating the reflected signal at a termination.

The step of dissipating the energy of the upper and lower sidebands in step 110 may include the steps of filtering the down-converted selected channel using a highpass filter to output the upper and lower sidebands; and outputting the upper and lower sidebands of the down-converted selected channel to a termination point for dissipating the energy of the upper and lower sidebands.

While the disclosed receiver and method have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A receiver for tuning a selected channel from an input spectrum, the receiver comprising:

an up-converter, responsive to a selection setting, for up-converting the input spectrum, including the selected channel and an unwanted spectrum portion;

a first diplexer for passing the up-converted selected channel and dissipating the energy of the unwanted spectrum portion of the input spectrum via a termination port to reduce distortion effects on the up-converter;

a down-converter for down-converting the up-converted selected channel having associated upper and lower sidebands and an intermediate frequency component; and a second diplexer for passing the intermediate frequency component and dissipating the energy of the upper and lower sidebands of the down-converted selected channel via a termination point in a manner to improve intermodulation of the down-converter.

2. The receiver of claim 1 wherein the first diplexer includes:

a first coupler for receiving the up-converted selected channel, the first coupler operatively connected to the termination port;

a second coupler for combining filtered signals to be the up-converted selected channel for output to the down-converter; and a plurality of bandpass filters operatively connecting the first and second couplers in a bridge configuration for filtering the channel to generate filtered signals;

wherein the termination port of the first coupler dissipates the unwanted spectrum reflected from the plurality of bandpass filters.

3. The receiver of claim 1 wherein the second diplexer includes:

a lowpass filter for filtering the down-converted selected channel;

a highpass filter for filtering the down-converted selected channel to output the upper and lower sidebands of the down-converted selected channel; and the termination point, operatively connected to the highpass filter, for dissipating the energy of the upper and lower sidebands to prevent reflection of the upper and lower sidebands to the down-converter.

4. A system for tuning a selected channel from an input spectrum, the system comprising:

a preamplifier for amplifying input power levels of the input spectrum below a predetermined threshold;

a preselector including:

a first mixer, responsive to a selection setting, for up-converting the input spectrum, including the selected channel and an unwanted spectrum portion;

a first diplexer for passing the up-converted selected channel and dissipating the energy of the unwanted spectrum portion of the input spectrum via a termination port to reduce distortion effects on the first mixer;

a second mixer for down-converting the up-converted selected channel having associated upper and lower sidebands and an associated intermediate frequency component; and a second diplexer for passing the intermediate frequency component of the down-converted selected channel and dissipating the energy of the upper and lower sidebands of the down-converted selected channel via a termination point to improve intermodulation of the second mixer; and an intermediate frequency strip for converting the down-converted selected channel to an intermediate frequency for output to a demodulator.

5. The system of claim 4 wherein the first diplexer includes:

a splitting coupler for receiving the up-converted selected channel, the first coupler operatively connected to the termination port, the termination port including a resistor;

a combining coupler for combining a filtered signal to be the up-converted selected channel for output to the down-converter; and a plurality of bandpass filters operatively connecting the splitting coupler and the combining coupler in a bridge configuration for filtering the channel to generate the filtered signals;

wherein the resistor operatively connected to the splitting coupler dissipates the unwanted spectrum reflected from the plurality of bandpass filters.

6. The system of claim 4 wherein the second diplexer includes:

a lowpass filter for filtering the down-converted selected channel; and a highpass filter for filtering the down-converted selected channel to output the upper and lower sidebands of the down-converted selected channel, the highpass filter operatively connected to the termination point, the termination point including a resistor;

wherein the resistor operatively connected to the highpass filter dissipates the energy of the upper and lower sidebands to prevent reflection of the upper and lower sidebands to the second mixer.

7. The system of claim 4 wherein the preamplifier includes:

a low-noise amplifier for amplifying the lower power levels of the input spectrum; and at least one switch for controlling the amplification of the input spectrum.

8. A method for tuning a selected channel from an input spectrum, the method comprising the steps of:

up-converting the input spectrum, including the selected channel and an unwanted spectrum portion;

passing the up-converted selected channel and dissipating the energy of the unwanted spectrum portion of the input spectrum via a termination port to reduce distortion effects in the up-converting step;

down-converting the up-converted selected channel having associated upper and lower sidebands and an associated intermediate frequency component; and passing the intermediate frequency component and dissipating the energy of the upper and lower sidebands of the down-converted selected channel via a termination point in a manner to improve intermodulation in the down-converting step.

9. The method of claim 8 wherein the step of dissipating the energy of the unwanted spectrum includes the steps of:

receiving the up-converted selected channel at a first coupler;

splitting the up-converted signal to generate split signals;

filtering the split signals using a plurality of bandpass filters to generate filtered signals;

generating a reflected signal from the filtering of the split signals from the plurality of bandpass filters, the reflected signal corresponding to the unwanted spectrum; and dissipating the reflected signal at the termination port.

10. The method of claim 8 wherein the step of dissipating the energy of the upper and lower sidebands includes the steps of:

filtering the down-converted selected channel using a highpass filter to output the upper and lower sidebands; and outputting the upper and lower sidebands of the down-converted selected channel to a termination point for dissipating the energy of the upper and lower sidebands.

* * * * *